(12) United States Patent
Lee

(10) Patent No.: US 9,648,970 B2
(45) Date of Patent: May 16, 2017

(54) IMPACT-RESISTANT PORTABLE LIQUID CONTAINER PROTECTOR WITH COOLING AND HEATING CAPABILITY

(71) Applicant: Simon Sung Lee, Carlsbad, CA (US)

(72) Inventor: Simon Sung Lee, Carlsbad, CA (US)

(*) Notice: Subject to any disclaimer, the term of this patent is extended or adjusted under 35 U.S.C. 154(b) by 79 days.

(21) Appl. No.: 13/987,829

(22) Filed: Sep. 6, 2013

(65) Prior Publication Data
US 2014/0069606 A1    Mar. 13, 2014

Related U.S. Application Data

(60) Provisional application No. 61/743,852, filed on Sep. 13, 2012.

(51) Int. Cl.
| | |
|---|---|
| *A47G 19/22* | (2006.01) |
| *A61J 9/00* | (2006.01) |
| *A61J 9/08* | (2006.01) |
| *A61J 11/00* | (2006.01) |
| *A47J 36/24* | (2006.01) |
| *B01F 13/08* | (2006.01) |
| *B01F 15/06* | (2006.01) |
| *A61J 11/04* | (2006.01) |

(52) U.S. Cl.
CPC ...... *A47G 19/2288* (2013.01); *A47J 36/2438* (2013.01); *A61J 9/001* (2013.01); *A61J 9/08* (2013.01); *A61J 11/008* (2013.01); *B01F 13/0818* (2013.01); *B01F 15/065* (2013.01); *A61J 9/005* (2013.01); *A61J 11/04* (2013.01); *A61J 2200/42* (2013.01); *A61J 2200/44* (2013.01); *A61J 2200/76* (2013.01)

(58) Field of Classification Search
CPC .................. A47J 36/2438; A47G 19/2288
See application file for complete search history.

(56) References Cited

U.S. PATENT DOCUMENTS

| | | | | |
|---|---|---|---|---|
| 1,762,171 | A | * 6/1930 | Goldsmith | ............. 219/436 |
| 2,582,781 | A | * 1/1952 | Johnson | ............. 219/436 |
| 4,240,272 | A | * 12/1980 | Tiede | ......... A45C 11/20 |
| | | | | 215/12.1 |
| 4,533,057 | A | 8/1985 | Klittich et al. | ......... 215/11 |
| 4,817,806 | A | 4/1989 | Billoud et al. | ......... 215/12.1 |

(Continued)

*Primary Examiner* — Abbas Rashid
(74) *Attorney, Agent, or Firm* — Shirley L. Church Esq.

(57) ABSTRACT

An impact-resistant portable container protector used during transportation of a liquid, wherein the portable container protector is capable of heating or cooling a liquid within the container during transportation in an automobile or other mobile vehicle. The heating is typically achieved using an electrically-powered heating jacket, or cooling is achieved using a removable cooling packet which may be placed within the impact-resistant portable container protector. Heat transfer from the heating jacket or cooling packet may be improved by use of an agitator which may be present within the container. The agitator may be turned by a magnetic coupling. Power to operate the heating jacket and the agitator, when present, is supplied by a battery which is internal to the portable container protector. Additional power may be supplied to the battery using an external power feed such as a USB type connection or other connection of the kind typically present in an automobile or other motor vehicle.

15 Claims, 5 Drawing Sheets

(56) References Cited

U.S. PATENT DOCUMENTS

| | | | |
|---|---|---|---|
| 5,177,981 A | 1/1993 | Haas | 62/457.3 |
| 5,313,807 A | 5/1994 | Owen | 62/457.3 |
| 5,483,799 A * | 1/1996 | Dalto | A61J 1/165 |
| | | | 62/3.6 |
| 6,082,114 A * | 7/2000 | Leonoff | A47J 31/005 |
| | | | 62/3.64 |
| 6,431,124 B2 | 8/2002 | Kwon | 122/13.3 |
| 6,571,564 B2 * | 6/2003 | Upadhye | A47J 36/2438 |
| | | | 165/80.5 |
| 6,870,135 B2 * | 3/2005 | Hamm et al. | 219/386 |
| 2004/0140304 A1 * | 7/2004 | Leyendecker | A47J 36/2433 |
| | | | 219/386 |
| 2006/0007781 A1 * | 1/2006 | Martin | A47J 31/401 |
| | | | 366/274 |
| 2011/0024537 A1 * | 2/2011 | Gonzalez | A47J 43/046 |
| | | | 241/101.2 |
| 2011/0033587 A1 * | 2/2011 | Jong et al. | 426/231 |

\* cited by examiner

IMPACT-RESISTANT PORTABLE LIQUID CONTAINER PROTECTOR WITH COOLING AND HEATING CAPABILITY

BACKGROUND OF THE INVENTION

Field of the Invention

The present invention relates to liquid container protectors which can provide heating capability, cooling capability, or both capabilities for a liquid inside the container.

Description of the Background Art

This section describes background subject matter related to the subject matter of the present invention. There is no intention, either express or implied, that the background art discussed herein is the best art which is available. Nor is there an intention either express or implied that the background art discussed in this section legally constitutes prior art.

There is a high demand for bottle protectors, whether it be for child protection purposes, for sports applications, or for any other application where a container for liquids may be impacted. Any time a beverage container is formed from glass or a brittle plastic, there is a possibility the container may shatter upon impact, not only causing the beverage to spill, but potentially causing injury to the user of the bottle.

Various kinds of insulated bottle containers have been developed, for purposes of keeping a liquid within a container either hot or cold. In addition, bottle containers which are designed to provide for heating or cooling of a liquid within the bottle are discussed in the art. Exemplary embodiments of bottle protectors with heating or cooling capability which were discovered by applicant during preparation for filing of the present application are discussed below.

U.S. Pat. No. 4,533,057 of Klittich, issued Aug. 6, 1985, and entitled: "Feeding Bottle With Tubular Housing For Clamping Flexible Container", describes a housing for a baby feeding bottle which comprises a tubular housing with an open end; a disposable, open-ended flexible bag-like container locatable in the interior of the housing with a mouth zone of the container folded over the upper end of the housing; and a teat or nipple which is locatable over the mouth of the container and the upper zone of the housing. The tubular housing is longitudinally divided into two halves which are movable between open and closed positions to facilitate loading of a container into the housing. (Abstract)

U.S. Pat. No. 4,817,806 of Billoud et al, issued Apr. 4, 1989, and entitled: "Bottle With Rounded Bottom Fitted With A Base And Provided With A Passage For A Heat-Exchange Fluid And Base For Same", describes a bottle with a rounded bottom, a lateral wall, and a separate base. The base comprises a lateral wall which surrounds and is fixed to a lower portion of the lateral wall of the bottle. It also comprises an annular support boss and a bottom part comprising an area supporting the bottom of the bottle. The bottle comprises a passage for a heat exchange fluid. This passage includes inlet and outlet areas for the heat exchange fluid. The flow of the fluid through the passage passes across part of the bottom of the bottle. This facilitates effective pasteurization or deep-freezing of the bottle's contents. (Abstract) There are fluid inlet and outlet areas spaced apart from each other through which a heat exchange fluid is flowed. (Claim 1).

U.S. Pat. No. 5,177,981 to Haas, issued on Jan. 12, 1993, and entitled: "Drink Cooler", describes a drink cooler to keep liquids cool. The cooler has three parts, a lid, a frusto-conical outer container and a resilient plastic bottle which, when placed inside a container having a radially inward protrusion creates an annular cavity into which water can be poured and frozen without breaking the glass, and after freezing, the resilient bottle may be removed to allow the outer container to function as a glass with one annular ice ring located around the inside of the outer container. (Abstract)

U.S. Pat. No. 5,313,807, to Owen, issued May 24, 1994, and entitled: "Insulated Holder With Cooler Pocket", describes an insulated bottle container which is characterized by a flexible enclosure having an inner insulation layer and a stiff bottom to facilitate freestanding and shock resistance. Elastic is provided in the neck and body portions of the enclosure to ensure a tight fit around a bottle, can or other container placed in the enclosure. At least one, and preferably a pair of refrigerant pockets are provided in the body of the enclosure to receive refrigerant capsules that may be frozen to provide cooling of the bottle, can or other container in the enclosure. One or more handles may be attached to the top portion of the enclosure for carrying purposes. (Abstract)

U.S. Pat. No. 6,431,124, to Kwon, issued Aug. 13, 2002, and entitled: "Instant Portable Hot Water Making Bottle", describes a portable vacuum insulated bottle which includes a heat source having a minimum volume and a heat pipe which acts as a heat transmitting device. With this construction, a portable vacuum insulated bottle is provided which makes hot water using liquid propane gas as a possible heat source. (Abstract) claim 1 recites that a heat transmitting device is installed in the liquid container, where one end of the heat transmitting device contacts the heat source, and a second, opposite end of the heat transmitting device extends only partially into the cavity of the liquid container. The fuel source is described as requiring ignition control, fuel feed control, a temperature sensor and a thermal controller to stop the fuel from flowing when the heat pipe is heated up to a certain temperature. (Col. 3, lines 5-37, for example).

SUMMARY OF THE INVENTION

The present device is a container protector into which a container such as a bottle may be fitted, to protect the bottle from impact. In addition, the container protector includes elements which permit heating of a fluid present within a container such as a bottle, cooling of a fluid present within the container, or a combination of both. The container protector, such as a bottle protector, for example, typically includes a battery which is located at the bottom of the container protector. However, the inventor contemplates that the battery may be in the form of a wall surround within the container protector as well.

The heating or cooling of a liquid contained in a container within the container protector is achieved using a heating jacket or a cooling packet which is placed within the container protector. Heat transfer from the heating jacket or cooling packet to the liquid may be improved by an agitator which is present within the container. The agitator may be turned by a magnetic coupling. Power to operate the heating jacket or the agitator is supplied by a battery which is internal to the container protector, and additional power may be supplied through the battery using an external power feed through a USB type connection, by way of example and not by way of limitation.

In one embodiment of the invention, when the amount of power remaining in the battery becomes low, a light is emitted through a transparent layer present at the base of the container protector, to indicate that the battery power is low.

The container protector typically includes a power inlet so that the battery may be charged from a power contact area within an automobile, using a USB connection/cord/electrical contact connection of the kind currently used to charge a computer or a cell phone within an automobile. In like manner, a USB connection/cord/power plug assembly of the type available for use with cell phones and other electronic devices, for example. The power input connection may be used to charge the battery within the container protector from any standard power outlet within a home or business.

When the liquid in the bottle is to be heated, the container protector includes, for example, a wire mesh/weaving, or other similar, somewhat uniform resistance heater surface. A heat transfer jacket which incorporates a resistance heater functions well. The heating jacket is present around an interior portion of the container protector, in a manner such that the jacket is in contact with at least a portion of a bottle, for example, which is placed in the container protector, to provide the heat transfer. If the liquid in the bottle is already heated and it desired to simply keep the liquid warm the power in the battery is typically adequate.

When a liquid in the container is to be cooled, the heat transfer source is typically a fluid-containing packet of the kind which can be placed in a refrigerator or freezer to cool the packet. The fluid containing packet fits along an interior surface of the container protector in a manner such that it is in contact with at least a portion of the container to be cooled, to provide the heat transfer. Since cooled liquids are often more viscous than heated liquids, obtaining good heat transfer from the cooling packet to the liquid in the container is more difficult. To improve the heat transfer, the bottom of the container may be shaped to provide a raised area, typically a narrow dome, in the center of the bottom of the container. A thin motion-transferring ring with raised cogs or other surfaces extending upward from the ring is placed over (and around) the narrow-topped dome, so that it slides downward toward the bottom of the container. The design of the ring is such that it can be dropped through the top of the bottle to land over and settle down at the base of the dome. On the bottom of the ring is at least one small magnet. Or, the entire bottom ring portion may be magnetic, for example. The container protector includes a space between the battery and the bottom side of the bottle, and in that space is a small motor, with a magnet on a lever arm or a magnetic turn table is attached to the motor. The polarity of the magnet on the turn table, for example, is such that, when the battery operates the motor, the magnet on the turn table works in cooperation with the magnet on the motion-transferring ring to turn the ring having agitation cogs on its upper surface. This causes the liquid in the bottle or other container to move within the interior of the bottle or other container, increasing the amount of heat transfer from the sidewalls of the container into the liquid in the container.

The motion-transferring ring may be removed from the bottom of the container by simply inverting the container and shaking. Or, the motion-transferring ring may be removed using a hook which is supplied in combination with the container protector. This permits easy cleaning of the motion-transferring ring, which is designed to withstand the temperatures required for sterilization, i.e., the motion-transferring ring may be dropped into boiling water for sterilization purposes without affecting the structure or performance of the ring.

Operation of the motion-transferring ring may consume sufficient power during operation that the container protector is best attached to an exterior source of power during operation of the motion-transferring ring.

The container protector may be designed solely for heating a liquid in the bottle, may be designed for solely cooling a liquid in the bottle, or may be designed to provide either for heating or cooling. In the latter instance, a heating jacket and a removable fluid-filled cooling packet are both present within a spacing between the container protector and the space occupied by the container. Typically the heating jacket is placed at a location nearest that of the interior surface of the container protector. The fluid-filled cooling packet is typically located between the heating jacket and the interior wall surface of the container protector. A bottle or other container which includes a dome in the center of the bottle or other container makes possible the use of a motion-transferring ring when desired. A switch is present along the exterior surface of the base of the container protector, so that power may be applied solely to the heating jacket, solely to the motor which drives the motion-transferring ring, or to both simultaneously. Again, when the motion-transferring ring is in use, it is best to have the a power source connected to the battery at the base of the container protector, to ensure that the battery does not run down too rapidly.

BRIEF DESCRIPTION OF THE DRAWINGS

To assist in the understanding of the above recited embodiments, a more particular description of specific embodiments described above may be had by reference to the appended drawings. It is to be noted, however, that the appended drawings illustrate only a portion of the typical embodiments, and are not therefore considered to be limiting in scope of the invention which is described herein. The invention includes other equally effective embodiments.

FIGS. 1A and 1B show exterior three dimensional views of one of the more attractive exterior designs of a container protector 100 of the kind which is described herein. The container protector 100 includes a removable cap 106 which snaps on to a lip 108 which extends upward from the main body 102 of the container protector 100. The design includes a liquid level viewing window 103 which includes a recessed transparent layer 104 through which the liquid in the bottle or other container is viewed. While FIGS. 1A and 1B show the container as a baby bottle, the container protector may be used in combination with a container for hot coffee, or for iced tea, for example, where the nipple 112 is replaced with another dispensing element for the liquid contained in the bottle.

DETAILED DESCRIPTION OF EXEMPLARY EMBODIMENTS

Figures 1A, 1B:
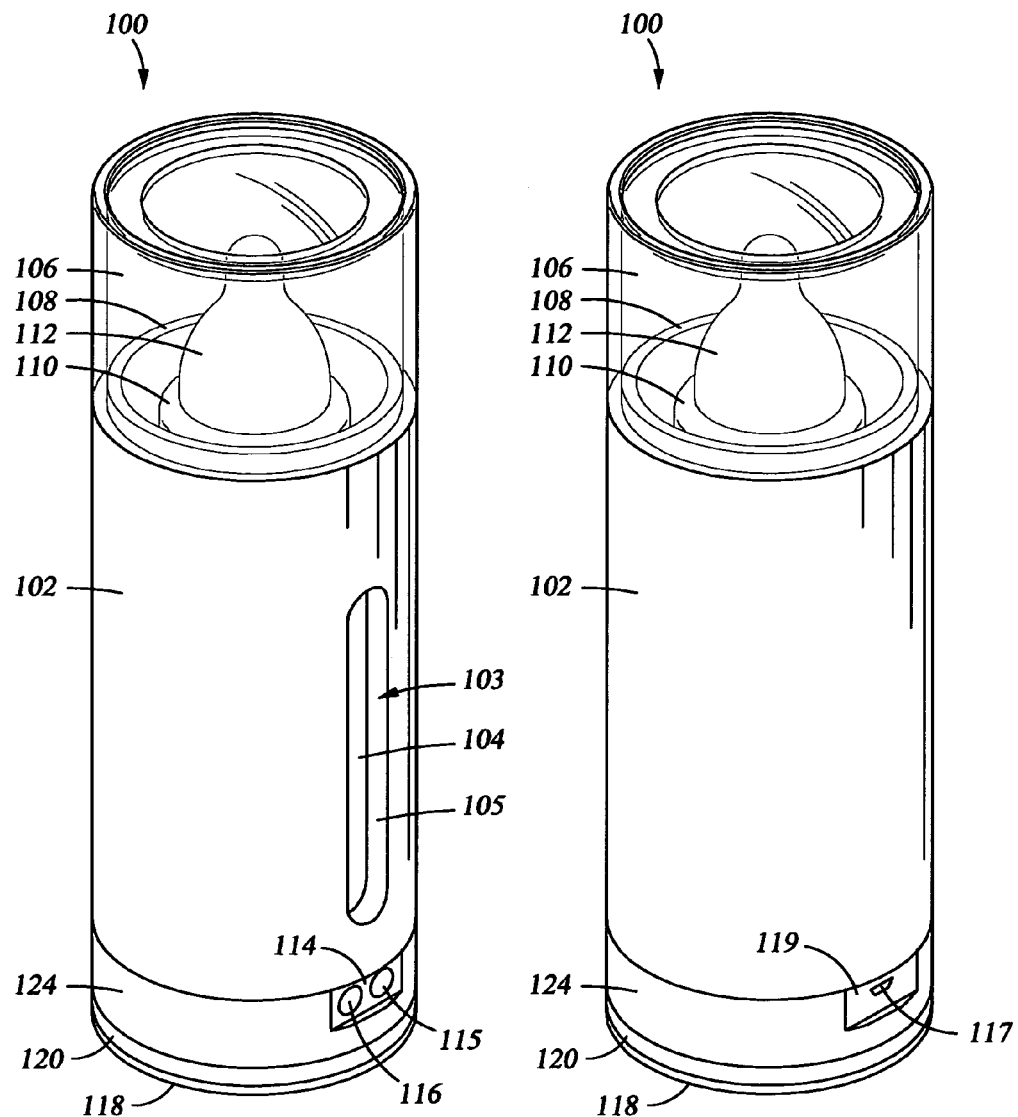

As a preface to the detailed description, it should be noted that, as used in this specification and the appended claims, the singular forms "a", "an", and "the" include plural referents, unless the context clearly dictates otherwise.

When the word "about" is used herein, this is intended to mean that the nominal value presented is precise within ±10%.

The present device is a container protector into which a container such as a bottle may be fitted, to protect the bottle from impact. In addition, the container protector includes elements which permit heating of a fluid present within a container such as a bottle, cooling of a fluid present within the container, or a combination of both. The heating or cooling of a liquid present within a container placed inside the container protector is achieved using a heating jacket or a cooling packet which is present within or placed within (respectively) the container protector. Heat transfer from the heating jacket or cooling packet to the liquid in the container may be improved by an agitator which is present within the container. The agitator may be turned by a magnetic coupling. Power to operate the heating jacket or the agitator is supplied by a battery which is internal to the container protector, and additional power may be supplied through the battery using an external power feed through a USB type connection, by way of example and not by way of limitation.

The container protector assembly, in its simplest embodiment, includes three housing/casing sections: A snap on cap which is used to cover a dispensing lid (such as a baby bottle cap with nipple) present on a liquid container; a middle casing (typically a one piece injection molded part which makes direct contact with the exterior surface of the main body of the liquid container); and a screw on battery pack (and wiring connection) at the bottom, which encases elements used to power up the unit.

A liquid container which is placed in the container protector is typically inserted into the top of a container protector while the snap-on cap is removed. The top of the liquid container extends above the middle casing, enabling the user to insert into and remove the liquid container from the middle casing section when the snap on cap is removed from the assembly.

The liquid container may be oriented to dispense liquid while present within the container protector, while the snap on cap is removed. In the alternative, the liquid container may be removed from the container protector when it is desired to dispense liquid present in the liquid container. In this latter instance, the container protector cannot protect the liquid container after removal, but protects the liquid container while it is being transported from one location to another, for example.

In one embodiment of the invention, there is an additional housing/casing section attached at the bottom of the screw-on battery pack casing. This additional casing section includes an indicator which indicates when the amount of power remaining in the battery becomes low. In ad advantageous embodiment, a light is emitted through a transparent layer present at the base of the container protector, to indicate that the battery power is low.

The container protector typically includes a power inlet so that the battery may be charged from a power contact area within an automobile, using a USB connection/cord/electrical contact connection of the kind currently used to charge a computer or a cell phone within an automobile. In like manner, a USB connection/cord/power plug assembly of the type available for use with cell phones and other electronic devices, for example. The power input connection may be used to charge the battery within the container protector from any standard power outlet within a home or business. The power inlet connection is typically included in area of the casing which encloses the battery pack.

When the liquid in the bottle is to be heated, the container protector includes, for example, a wire mesh/weaving, or other similar, somewhat uniform resistance heater surface. A heat transfer jacket which incorporates a resistance heater functions well. The heating jacket is present around an interior portion of the container protector, in a manner such that the jacket is in contact with at least a portion of a bottle, for example, which is placed in the container protector, to provide the heat transfer. If the liquid in the bottle is already heated and it desired to simply keep the liquid warm the power in the battery is typically adequate.

When a liquid in the container is to be cooled, the heat transfer source is typically a fluid-containing packet of the kind which can be placed in a refrigerator or freezer to cool the blanket. The fluid containing blanket fits along an interior surface of the container protector in a manner such that it is in contact with at least a portion of the container to be cooled, to provide the heat transfer. Since cooled liquids are often more viscous than heated liquids, obtaining good heat transfer from the cooling packet to the liquid in the container is more difficult. To improve the heat transfer, the bottom of the container may be shaped to provide a raised area, typically a narrow dome, in the center of the bottom of the container. A thin motion-transferring ring with raised cogs or other surfaces extending upward from the ring is placed over (and around) the narrow-topped dome, so that it slides downward toward the bottom of the container. The design of the ring is such that it can be dropped through the top of the bottle to land over and settle down at the base of the dome. On the bottom of the ring is at least one small magnet. Or, the entire bottom ring portion may be magnetic, for example. The container protector includes a space between the battery and the bottom side of the bottle, and in that space is a small motor, with a magnet on a lever arm or a magnetic turn table is attached to the motor. The polarity of the magnet on the turn table, for example, is such that, when the battery operates the motor, the magnet on the turn table works in cooperation with the magnet on the motion-transferring ring to turn the ring having agitation cogs on its upper surface. This causes the liquid in the bottle or other container to move within the interior of the bottle or other container, increasing the amount of heat transfer from the sidewalls of the container into the liquid in the container.

The motion-transferring ring may be removed from the bottom of the container by simply inverting the container and shaking. Or, the motion-transferring ring may be removed using a hook which is supplied in combination with the container protector. This permits easy cleaning of the motion-transferring ring, which is designed to withstand the temperatures required for sterilization, i.e., the motion-transferring ring may be dropped into boiling water for sterilization purposes without affecting the structure or performance of the ring.

Operation of the motion-transferring ring may consume sufficient power during operation that the container protector is best attached to an exterior source of power during operation of the motion-transferring ring.

The container protector may be designed solely for heating a liquid in the bottle, may be designed for solely cooling a liquid in the bottle, or may be designed to provide either for heating or cooling. In the latter instance, a heating jacket and a removable fluid-filled cooling packet are both present within a spacing between the container protector and the space occupied by the container. Typically the heating jacket is placed at a location nearest that of the interior surface of the container protector. The fluid-filled cooling packet is typically located between the heating jacket and the interior wall surface of the container protector. A bottle or other container which includes a dome in the center of the bottle or other container makes possible the use of a motion-transferring ring when desired. A switch is present along the exterior surface of the base of the container protector, so that power may be applied solely to the heating jacket, solely to the motor which drives the motion-transferring ring, or to both simultaneously. Again, when the motion-transferring ring is in use, it is best to have the a power source connected to the battery at the base of the container protector, to ensure that the battery does not run down too rapidly.

FIGS. 1A and 1B show exterior three dimensional views of one of the most attractive designs of a container protector of the kind which is described herein. The container protector 100 includes a removable cap 106 which snaps on to a lip 108 which extends upward from the main body 102 of the container protector 100. The design shown includes a liquid level viewing window 103 which includes a recessed transparent layer 104 through which the liquid in the bottle is viewed. While FIGS. 1A and 1B show the liquid container as a baby bottle, the container may be one which is used for hot coffee, or for iced tea, for example, where the nipple 112 is replaced with another dispensing element for the liquid contained in the container. The base of the container protector is made up of a number of different elements, including on-off buttons 115 and 116 for the heating element (not shown) and the agitation device (not shown). The base of the container protector also includes an electrical connection 117 which may be used to supply power to a re-chargeable battery (not shown) which is present in the base of the container protector. Electrical connection 117 may be USB type connector of the kind commonly used in automobiles to charge electronic devices. An optional feature at the bottom of the container protector 100 is a transparent layer 118 which may be lighted using an interior LED (not shown) to indicate when the power in the battery is low. In one embodiment, the on-off buttons 115 and 116 may be lighted when they are in the "on" position.

Figure 2:
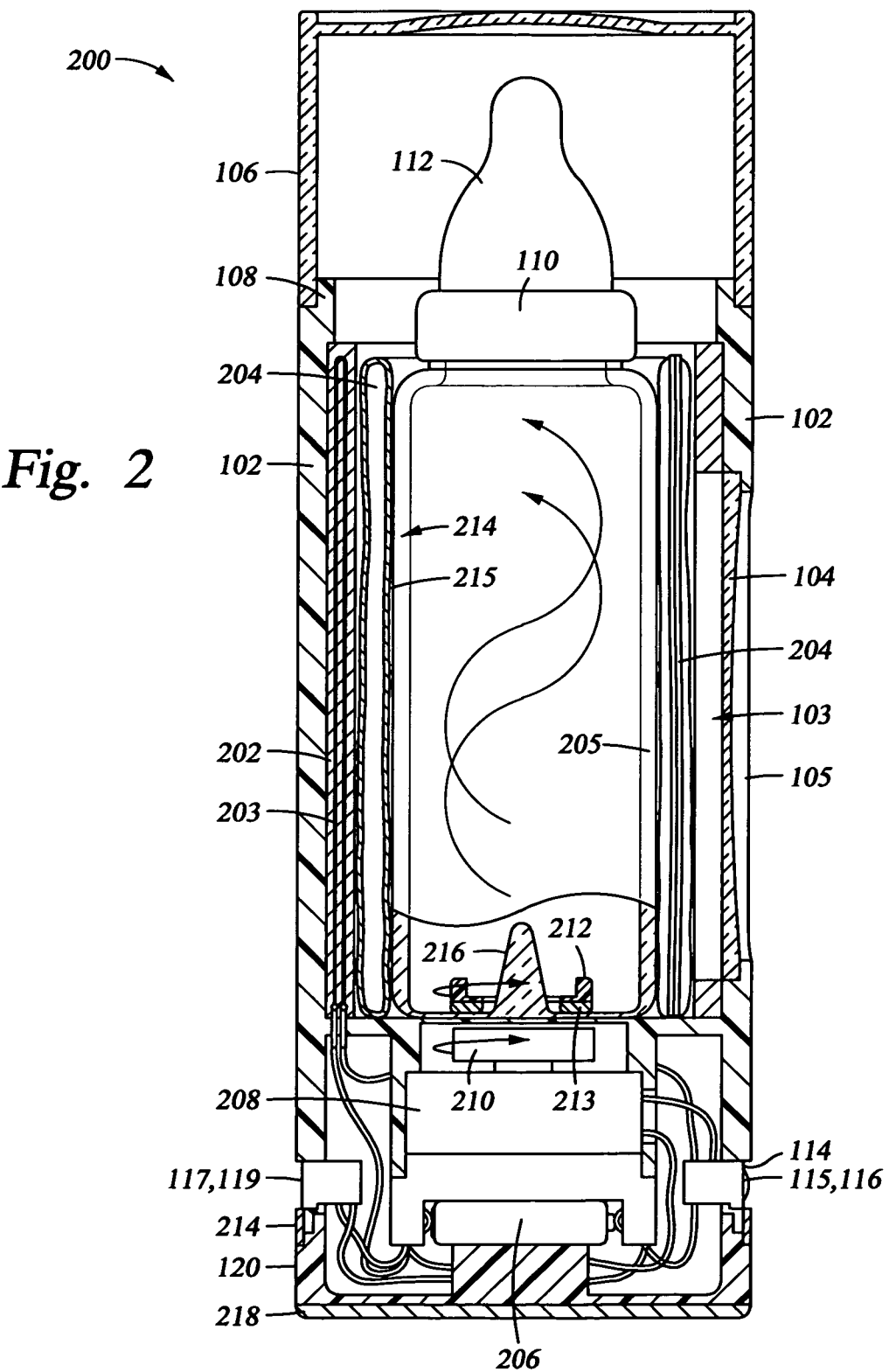
FIG. 2 shows one advantageous embodiment of an assembly 200 of container protector 100 which is capable of either heating or cooling a liquid present within a container placed in the container protector. It is possible for there to be embodiments of the container protector which only heat the liquid in the bottle or other container, or only cool the liquid in the bottle or other container. In a dual function container protector, an electrical heating jacket 202 is used to heat the bottle, and when heating is being carried out, the cooling packet 204 may be removed and a bottle or other container 214 having a larger diameter may be used so that there is intimate contact between the heating jacket 202 and the exterior surface 215 of bottle or other container wall 214, to create better heat transfer. In an alternative, the heating jacket may be in the form of a wire mesh (not shown), which is thinner and more movable than a heating jacket, and which may be collapsed directly around the exterior of the bottle when the cooling packet 204 is not present in the container protector assembly 200. When cooling is carried out, the heating jacket may remain in place, with the heating power turned off, to provide insulation of the cooling packet 204 with respect to the environment exterior to the container protector.

FIG. 2 shows an assembled container protector 200 which is capable of either heating or cooling a liquid present within the container protector. It is possible for there to be embodiments of the container protector which either heat the liquid in the bottle or other container only, or cool the liquid in the bottle 205 or other container only. In the dual function container protector, an electrical heating jacket 202 is used to heat a bottle, for example, and when heating is being carried out, the cooling packet 204 may be removed and a bottle 214 having a larger diameter may be used so that there is intimate contact between the heating jacket 202 and the exterior surface 215 of bottle wall 214, to create better heat transfer. When cooling is carried out, the heating jacket may remain in place, with the heating power turned off, to provide insulation of the cooling packet 204 from the environment exterior to the container protector. The cooling packet 204 may be filled with water or a gel, and is of the kind which may be placed in a freezer for cooling prior to placement within the container protector. The bottom wall of the bottle or other container 205 may be raised in the center to form a dome, which is used to hold an agitating device 212/213 in place. The dome may be hollow on the underside, rather than solid (as shown). The agitating device 212/213 may be used during either heating or cooling of the liquid in the bottle, to help improve heat transfer from either the heating or cooling packet. The agitating device includes a lower surface 213 which is magnetic. This ring lower surface 213 is turned about the dome 216 by a motor 208 which turns a magnetic table 210 which is adjacent lower surface 213 of the agitating device 212. The lower portion of the container protector contains electrical wiring, a rechargeable battery 206, a on-off button panel 114, and a power input connector 117. The lower portion of the container protector 200 may optionally include a transparent layer 118 which is lighted by an LED, for example, to indicate when the battery is low.

Figure 3:
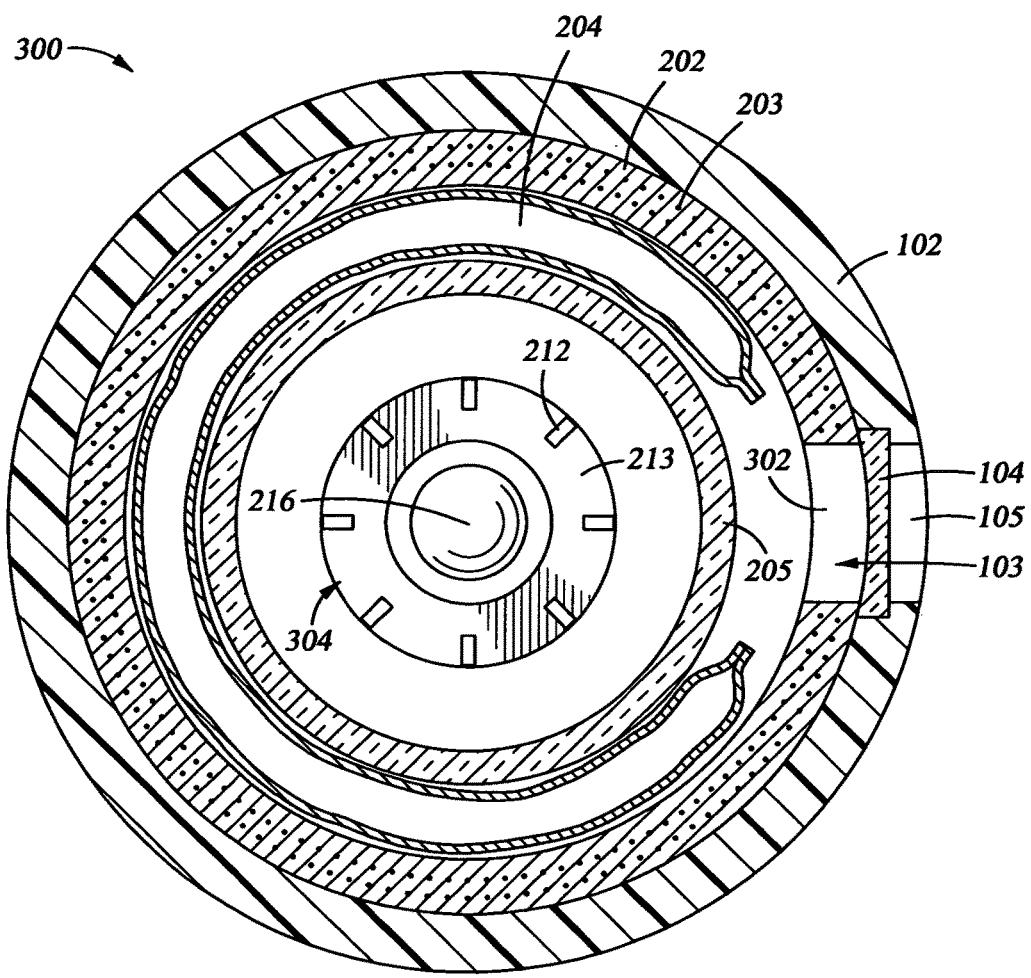
FIG. 3 shows a top view 300, looking down into container protector 100. This top view illustrates the relationship of the various elements present in container protector 300. There is an exterior wall 102 of the container protector, which may include a liquid indicator structure 103. Some embodiments of the container protector may not have a liquid level indicator. When a liquid level indicator is present, a recessed area 105 is present within the exterior wall 105, and a transparent layer 104 is interior of the recessed area, and located on the interior surface of wall 102 of the container protector. In addition, the liquid indicator structure includes an open area 302 which passes through a section of heating jacket 202, to provide a view of the liquid present within the interior of bottle wall 205, which is transparent. Since the cooling packet 204 does not pass between the open area 302 and the bottle wall 205, there is a clear view of the liquid present within the bottle.

FIG. 3 shows a top view 300, looking down into container protector 100. This top view illustrates the relationship of the various elements present in container protector 300. There is an exterior wall 102 of the container protector, which comprises a portion of a liquid indicator structure 103. A recessed area 105 is present within the exterior wall 105, a transparent layer 104 is interior of the recessed area and located on the interior surface of exterior wall 102 of the container protector 300. In addition, the liquid indicator structure includes an open area 302 which passes through a section of heating blanket 202, to provide a view of the liquid present within the interior of bottle wall 205, which is transparent. Since the cooling packet 204 does not pass between the open area 302 and the bottle wall 205, there is a clear view of the liquid present within the bottle. FIG. 3 also shows the agitation device 304 (212/213) which is present around the dome 216 located at the center, bottom of the bottle 205.

Figure 4:
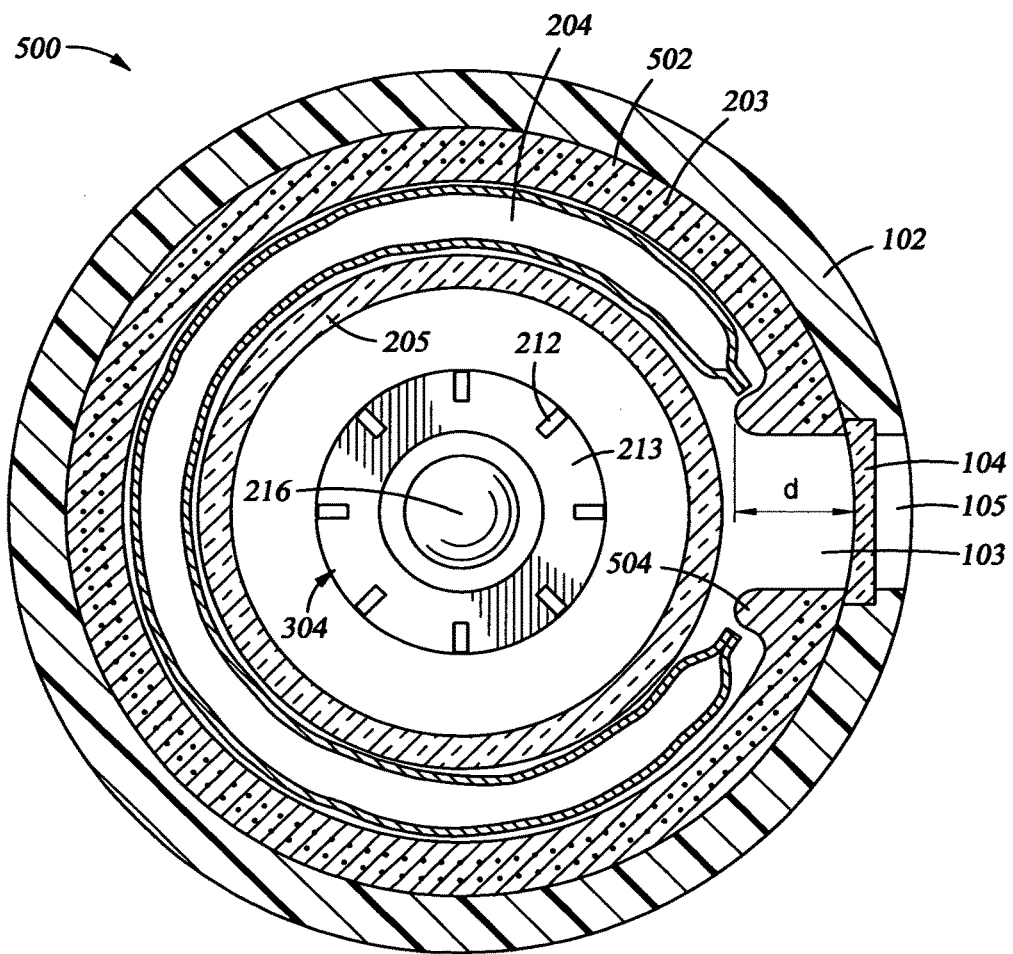
FIG. 4 shows a view 400 from the top of the bottle protector 100 in which an advantageous embodiment of the heating element has extended barrier regions 504 which extend a depth "d" inward from the transparent window 104. These barrier regions 104 are used as retainer walls to hold the cooling packet 204 in place so that it will not slide within the bottle protector 100 and block the viewing window 103.

FIG. 4 shows a view 400 from the top of the bottle protector 100 in which an advantageous embodiment of the heating element 402 includes extended barrier regions 404 which extend a depth "d" inward from the transparent window 104. These barrier regions 404 are used as retainer walls to hold the cooling packet 204 in place so that it will not slide within the bottle protector 100 and block the transparent layer 104 of viewing window 103.

Figure 5:
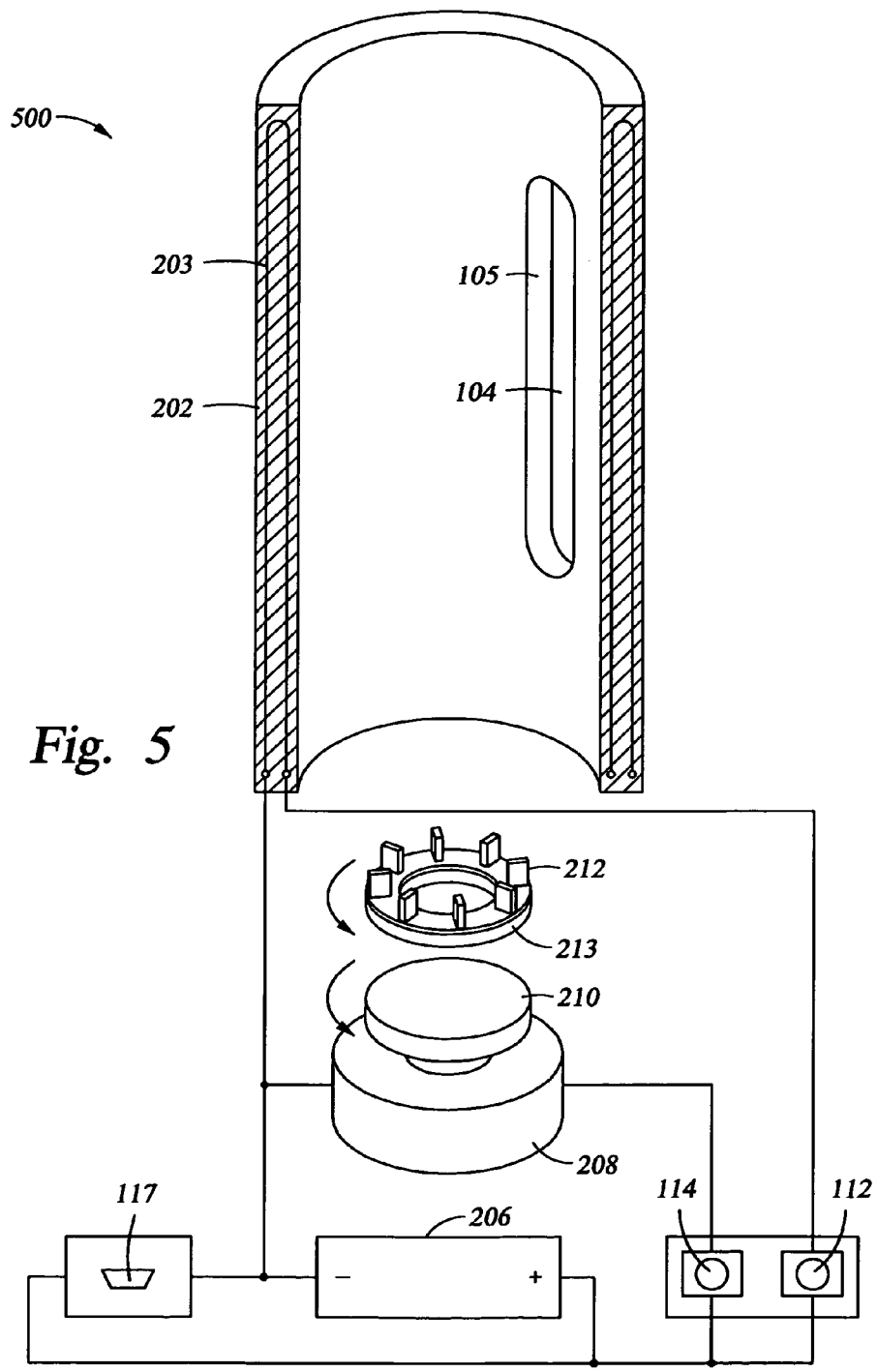
FIG. 5 illustrates an electrical diagram 500 which shows connections between various elements of the bottle or other container protector which use power.

FIG. 5 shows a wiring diagram 500, which shows the connection between a power supply (the battery 206 or the battery in combination with a connection 117 to an outside power supply (not shown)). On-off button 116 controls the power sent to motor 208, which turns magnetic table 210, which works in combination with agitator ring 213 to turn agitator 212/213. On-off button 115 controls the power sent to wires 203 within heating jacket 202.

The bottle protector of the present invention not only protects the bottle from impact, but also makes it possible to cool or heat a liquid which is present within the bottle. When the liquid placed in the bottle is cold or hot to begin with, and all that is desired is to maintain the temperature of the liquid, the heating jacket or the cooling packet may be used without the agitator. However, when it is desired to warm the liquid within the bottle, or to cool the liquid within the bottle, it is particularly helpful to use the agitator described to improve the heat transfer. If the liquid in the bottle is viscous, use of the agitator will consume a significant amount of power, and it is helpful to have the bottle protector connected to an exterior power source.

The heating and cooling features of the bottle protector may be used with liquid containers of various shapes, and the drawings provided as a part of this invention description are not intended to limit the shape of the container protector or the shape of a liquid container which is used inside the container protector. All that is required is that there is good heat transfer from the heating jacket or cooling packet to the liquid in the container.

The above described exemplary embodiments are not intended to limit the scope of the present invention, as one skilled in the art can, in view of the present disclosure, expand such embodiments to correspond with the subject matter of the invention claimed below.

I claim:

1. An impact-resistant portable container protector for transportation of a liquid, wherein a container such as a baby bottle, or other container having restricted flow for a liquid out of a top of said container, may be inserted into said portable container protector, wherein said portable container protector offers either heating or cooling capability at a given time for said liquid, said portable container protector comprising:
   at least one impact-resistant exterior wall, including a removable cap, which surrounds said container to provide impact protection for said container;
   at least two heat transfer elements, one of which is used at a given time, wherein at least one element provides for heat transfer in the form of a removable cooling packet, and at least one element provides for heat transfer in the form of an electrically powered heating jacket;
   at least one internal battery power supply which is present interior of said at least one exterior wall of said portable container protector; and
   at least one connection through said at least one exterior wall, for the input of external power into said at least one internal battery power supply.

2. An impact-resistant portable container protector in accordance with claim 1, wherein said at least one heat transfer element which provides for heating is in the form of a resistance heater present as part of the heating jacket.

3. An impact-resistant portable container protector in accordance with claim 1, wherein said at least one heat transfer element which provides for cooling comprises the removable cooling packet which is placed within a space provided interior of said exterior wall of said portable container protector, wherein said space is designed to hold said cooling packet in position within said portable container protector.

4. An impact-resistant portable container protector in accordance with claim 1, or claim 2, or claim 3, wherein a magnetic coupling is present within said portable container protector, adjacent a location at which a bottom of a container is placed, so that an agitator present within and near said bottom of said container can be used to agitate a liquid which is present within said container.

5. An impact-resistant portable container protector in accordance with claim 1, or claim 2, wherein said portable container protector includes at least one on-off button which controls a supply of power to a heating element.

6. An impact-resistant portable container protector in accordance with claim 4, wherein said container protector includes at least one on-off button which controls a supply of power to said agitator.

7. An impact-resistant portable container protector in accordance with claim 4, wherein said agitator makes use of said magnetic coupling to turn said agitator.

8. An impact-resistant portable container protector in accordance with claim 3, wherein said removable cooling packet is in the form of a packet which is filled with water or another heat transfer medium which may be cooled in a refrigerator or freezer.

9. An impact-resistant portable container protector in accordance with claim 8, wherein an internal sidewall present within said container protector includes a raised area which keeps said removable cooling packet in a given position within said portable container protector.

10. An impact-resistant portable container protector in accordance with claim 5, wherein said heating element is in the form of a resistance heater.

11. An impact-resistant portable container protector in accordance with claim 10, wherein said resistance heater is an electrical heating jacket which contains internal wiring.

12. An impact-resistant portable container protector in accordance with claim 10, wherein a said resistance heater is in the form of a wire mesh jacket.

13. An impact-resistant portable container protector in accordance with claim 1, wherein said external power is a power source available within a motor vehicle, which power source makes use of a USB connection or other connection of the kind available for use with cell phones and other electronic devices.

14. An impact-resistant portable container protector in accordance with claim 13, wherein a magnetic coupling is present within said portable container protector, adjacent a location at which said container is placed, so that an agitator present within said container can be used to agitate a liquid which is present within said container.

15. An impact-resistant portable container protector in accordance with claim 13, wherein said portable container protector includes at least one on-off button which controls the supply of power to a heating element, or to a magnetic coupling for an agitator, or to both.

* * * * *